May 9, 1950        H. W. WOOLLEY        2,506,625
PHOTOELECTRIC CELL
Filed July 8, 1946
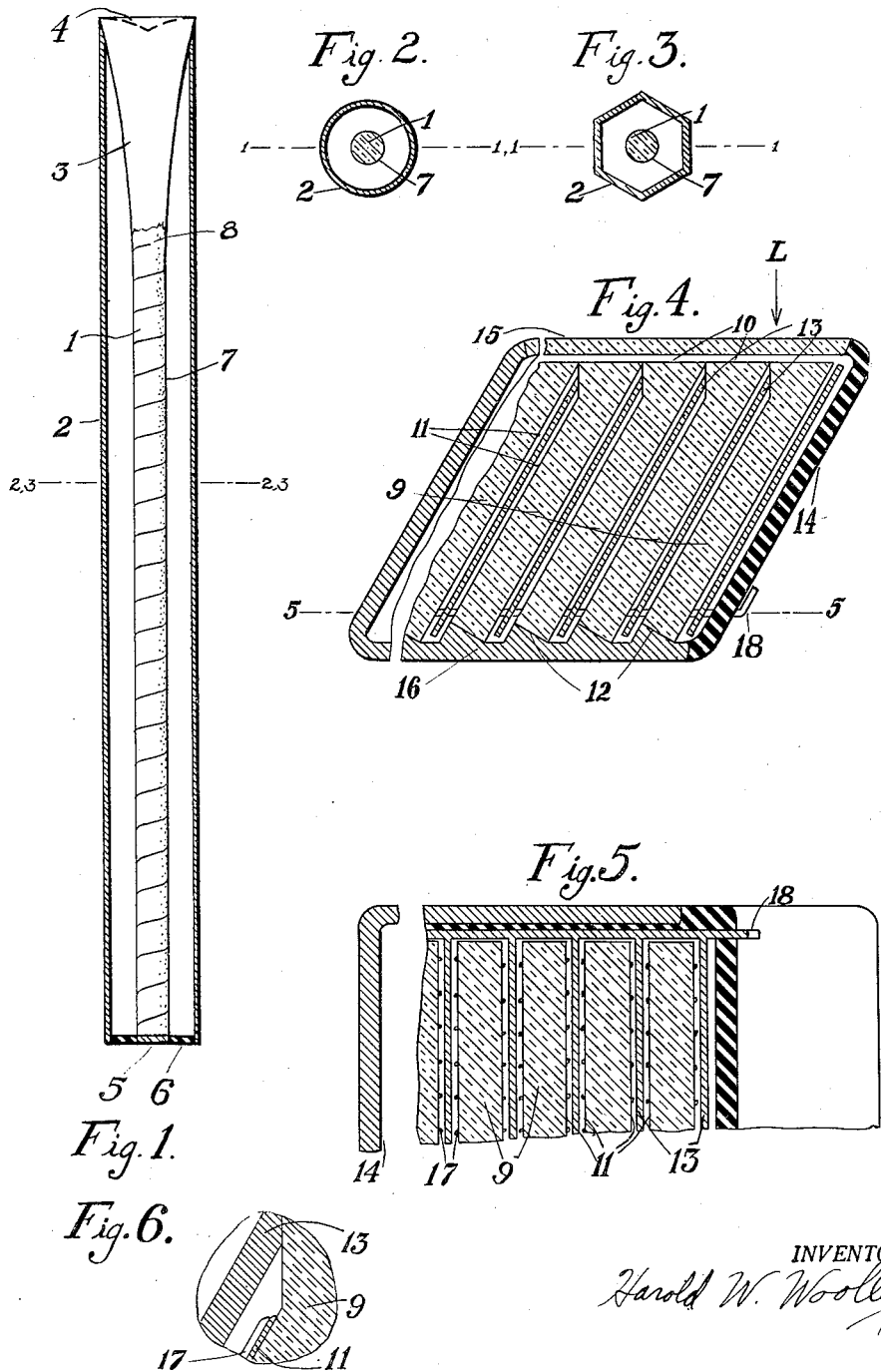
INVENTOR.
Harold W. Woolley

Patented May 9, 1950

2,506,625

UNITED STATES PATENT OFFICE 2,506,625

PHOTOELECTRIC CELL

Harold W. Woolley, Kensington, Md.

Application July 8, 1946, Serial No. 681,946

14 Claims. (Cl. 250—165)

My invention relates to improvements in photoelectric cells, and primarily to photoelectric cells of the emission type; and the objects of my improvement are, first, to provide a basic design favorable to increased efficiency in photoelectric processes; second, to increase the primary emission current of the photoelectric cell for given light flux from a specific direction; third, to make the emission type photoelectric cell more suitable to the direct production of electrical energy from light.

I attain these objects by employing construction illustrated in the accompanying drawing, in which:

Figure 1 is a side view of a photoelectric cell with the case of the cell sectioned longitudinally; Figure 2 and Figure 3 are transverse sections of alternate forms of the photoelectric cell shown in Figure 1. Figure 3 is considered a preferred embodiment. Figure 4 is part of a vertical section and Figure 5 is part of a horizontal section of a third form of photoelectric cell. Figure 6 shows a detail of the device of Figures 4 and 5.

Similar numerals refer to similar parts throughout the several views.

A support 1 shown formed as a rod of transparent inert solid such as quartz or a suitable plastic with optically smooth surfaces extends the length of the photocell along the central axis of the cylindrical metallic case 2. One end 3 of the rod is flared into a conical shape to occupy one entire end of the cell and possesses an exposed surface 4 curved in such a manner as to direct incident light into a favorable orientation. Light incident nearly parallel with the axis will be refracted at surface 4, which is dimpled centrally as shown by the dashed curve, and then be totally reflected at the flared surface of the rod so as to be conducted the full length of the rod with many similar repeated reflections. The unflared end of the transparent rod is in direct contact with the mirror surface of a metal cap 5 perpendicular to the axis of the rod. Light in the rod, striking the cap, is reflected so as to continue with many reflections toward the flared end of the rod. The cap is centered by a washer-shaped piece of electrical insulating material 6 sealed to the cap and the case and enclosing the interior of the cell which is permanently evacuated.

The cylindrical surface of the rod 1 is coated with and acts as a support for an extremely thin photoelectric film 7 such that light striking the film from within the rod can cause photoelectrons to be ejected. The light would be reflected totally except for absorption in connection with this photoelectric process caused by the presence of the photoelectric film. The ejected electrons will strike the case 2 whose inner surface is a non-photoelectric electrical conductor and acts as a collector of the electrons. Electrical connection of the photoelectric film with the cap 5 may be improved by having a very fine wire 8 or other similar conductor shown as wound helically along the rod and connecting it to the cap. The cap 5 and the case 2 form the two electrodes of the cell.

The case 2 may be of circular cross section as shown in Figure 2 or it may be of hexagonal cross section as shown as a preferred embodiment in Figure 3 or it may be of some other shape. The hexagonal cross section permits the cell to fit with other cells into a honeycomb structure to provide coverage of an extended surface. It is also pointed out that while the rod 1 was described as having a cylindrical surface, it is possible in the invention for the rod to have a cross section different from circular.

Since the light flux carried by the light-conducting rod is effectively confined to the interior of the rod and a space of a very few wave lengths of light outside of the rod, the parasitic absorption of light by the metallic conductor 8 can be kept small by keeping small the amount of its material within a very few wave lengths of the light-conducting rod.

In a third embodiment, shown in Figures 4 and 5, parallel spaced oblique support sheets 9 of transparent inert solid such as quartz or a suitable plastic with optically smooth surfaces are flared near adjacent extremities 10 to form a continuous front, the surfaces 10 being so oriented that light from a particular direction L will enter the support sheets and undergo essentially total internal reflections in large number at the major surfaces of the sheets, the reflections being total except for absorption by thin photoelectric films 11 coating the sheets. Plane metallic mirror surfaces 12 terminate the support sheets perpendicularly to each so that light in a sheet will be reflected by the mirror surface so as to continue making essentially total reflections at the major surfaces of the sheet and thus have increased exposure to the photoelectric films. Metallic sheets 13 between the support sheets 9 face the photoelectric films and collect electrons emitted by the photoelectric films. An evacuated envelope 14 encloses the assemblage described and is shown with a window 15 to admit light to the surfaces 10. An electrical conductor 16 is shown with branches 17, of small cross section, adhering to the major surfaces of the sheets 9 and furnishes a distributed electrical connection to the photoelectric films. An electrical conductor 18 makes electrical connection to the sheets 13, conductors 16 and 18 being insulated from each other and extending through the envelope 14 to provide external electrodes. Figure 6 is an enlarged detail at the top end of a sheet 13 showing that films 11 and conductors 17 terminate at a distance from sheets 13, so as to provide electrical insulation. While conductors 17 are shown for purposes of illustration as having considerable size, they would preferably be made as very fine metallic filament-like deposits on the surfaces of support sheets 9 before the photoelectric film is formed. Similarly, the photoelectric films are shown greatly exaggerated in thickness, while actually they are to be extremely thin, probably less than 5 atomic diameters in thickness.

In each of the embodiments, a means is provided by which the light rays undergoing total internal reflections are made to be at angles approaching the limit for total reflection in order to increase the number of encounters with the photoelectric film. In Figures 1 and 4 of the drawing, the shape and orientation of the surfaces at the region of entry of the light are shown with a form so determined that this condition is achieved.

The cylindrical symmetry employed in the first two embodiments is relatively favorable for the production of an electric current flowing against a voltage built up by the photoelectric process. Superiority to the plane construction of the third embodiment can be seen in two regards. When cylindrical symmetry is used, components of velocity of electrons in two independent directions are largely convertible into potential energy, while in the plane construction only one such component of velocity is so convertible. In the plane construction, light of such polarization as to be most effective photoelectrically would be absorbed preferentially while light of opposite polarization would be less effectively used. In the cylindrical construction, light that is not precisely in a radial plane of the rod has its successive reflections at surfaces that are not parallel, so that polarization of the light by reflection is to some extent avoided. Polarization of the light may be avoided more completely in the different cases by fluting the surfaces of the transparent supporting members, whether rod or sheet, in the general direction in which the light is conducted.

Various changes and modifications may be made in the embodiments described without departing from the invention as will be obvious to those skilled in the art. The claims made should be understood as covering all such changes and modifications as are consistent with the spirit of the invention.

While I am aware that transparent rods have been used to conduct light to a photocell, it is a distinctive feature in the present invention that the light-conducting rods or sheets are essential parts of the photocells, since the action of the light on the photoelectric substance takes place at the surface of the rod or sheet itself under conditions approaching total reflection and by this means a special advantage arising from the conservation of unabsorbed light is obtained. Accordingly, I do not claim the use of light-conducting rods broadly; but

I claim:

1. The combination in a photoelectric cell of a transparent light-conducting rod, a thin photoelectric film coating the surface of the rod, and a plane perpendicular mirror facing one end of the rod.

2. The combination of a transparent support with optically smooth surfaces, a thin photoelectric film coating a surface of the support, surfaces of the support so oriented that light from a preferred direction will enter the support and undergo many total reflections at an angle approaching the critical angle for total reflection, the reflections being total except for absorption by the thin photoelectric film.

3. The combination of a transparent support with optically smooth surfaces, a thin photoelectric film coating a surface of the support, surfaces of the support so oriented that light from a preferred direction will enter the support and undergo many total reflections at an angle approaching the critical angle for total reflection, the reflections being total except for absorption by the thin photoelectric film, an electrical conductor so placed as to collect electrons emitted by the photoelectric film.

4. The combination of a transparent sheet with optically smooth surfaces, thin photoelectric films coating major surfaces of the sheet, surfaces across the thickness of the sheet so oriented that light from a favored direction will be conducted by the transparent sheet with a great number of total reflections near the critical angle for total reflection, the reflections being total except for absorption by the thin photoelectric film.

5. The combination of a transparent member, an electrically conducting case partially surrounding said member, a portion of said member within said case being spaced from said case, a means for rendering vacuum-tight the space so formed, the space being evacuated, and a portion of the transparent member within the space being coated with a thin photoelectric film, said film being entirely spaced from said case, and means for conducting electrons to said film, also, a means for causing a major portion of light within the transparent member to strike the photoelectric film at an angle allowing total reflection but approaching the critical angle for total reflection so as to allow many repeated reflections.

6. The combination of a transparent support with surfaces such that light from one general direction will enter and be conducted by internal reflections, essentially total, in a direction of major extension of the support, thin photoelectric films coating major surfaces of the support, a plane mirror perpendicular to said direction of major extension and bounding the support at a part optically remote from the region of entry of light into the support in such a manner that the reflected light remains effectively confined to the interior of the transparent support through the medium of repeated total reflections.

7. The combination of a transparent member conducting light by essentially total internal reflections, thin photoelectric films coating said member and absorbing light photoelectrically at its reflection, a plane mirror terminating said member perpendicularly reversing the direction of light flux which is conserved in magnitude through essentially total internal reflections, an electrical conductor furnishing a means for collecting electrons liberated by the photoelectric film.

8. The combination of a transparent rod conducting light by internal reflection, a thin photoelectric film coating the rod, said rod being flared and shaped at the flared end so that light from a preferred direction will be concentrated into the straight part of the rod at such internal angles that many reflections will occur, total except for absorption by the photoelectric film coating the rod.

9. The combination of a transparent rod, a thin photoelectric film coating the rod, auxiliary electrical conductors of small cross section overlying the surface of the rod and enhancing electrical connection to the photoelectric film.

10. The combination of a transparent rod with optically smooth surfaces, a thin photoelectric film coating the rod, said rod being flared and shaped at the flared end so that light incident from a preferred direction will be concentrated into the straight part of the rod with many internal reflections, total except for absorption by the photoelectric film coating the straight part of the rod, auxiliary electrical conductors of small cross section so overlying the surface of the rod that very little of their surface is within the major field of light flux following the rod.

11. The combination of a transparent light-conducting rod, a thin photoelectric film coating the rod, the rod being terminated by a plane metallic mirror perpendicular to the rod.

12. The combination of a transparent rod with optically smooth surfaces, a thin photoelectric film coating the cylindrical surface of the rod, said rod being so shaped near one end that light incident from a preferred direction will be concentrated into the straight part of the rod with internal reflections, total except for absorption by the photoelectric film coating the straight part of the rod, wire-like electrical conductors on the surface of the rod providing better electrical connection between the thin photoelectric film and a plane perpendicular metallic mirror cap terminating the rod, an insulating washer sealing the cap in the center of one end of a cylindrical electrically conducting case coaxial with the rod and sealed at the other end to the extremity of the flared part of the rod, the enclosed space between rod and case being evacuated.

13. The combination of thin metallic sheets uniformly spaced and parallel to each other and connected electrically to one electrical terminal, sheets of transparent solid placed between and spaced from said metallic sheets, said sheets of transparent solid having all surfaces optically smooth and having on their large surfaces extremely thin photoelectric films and metallic filaments furnishing electrical connection with a second insulated electrical terminal, each transparent sheet having a narrow surface unobscured to admit light into the interior of the sheet and having its other narrow surfaces perpendicular to the large surfaces of the sheet, these narrow surfaces being coated with metal so as to provide high reflectivity for light in the sheets, an evacuated vacuum-tight envelope enclosing the assemblage and fitted with external electrodes connected electrically to the internal electrical parts.

14. The combination of a metal tube, a transparent rod inside the tube along its axis and having optically smooth surfaces, the diameter of said rod being roughly one third the diameter of the tube, the rod flaring smoothly to the full diameter of the tube at one end of the tube in a distance between one and a half and four times the diameter of the tube, the curve of flare approximating the arc of a circle with radius eight to sixteen times the diameter of the tube, the exposed end of the rod adjacent to the flared surface being dimpled centrally to have an axially symmetric surface whose generating curve approximates the arc of a circle with radius roughly equal to the diameter of the tube and center of the circle in the vicinity of the tube wall, the other end of said rod being held centrally in the tube by a vacuum-tight insulating washer, said end being terminated by a plane mirror surface facing the rod and perpendicular to the axis of the rod, the cylindrical surface of the rod within the tube being coated with a continuous thin photoelectric film of thickness of the order of a single atomic diameter and bearing a suitable number of slender metallic filaments extending along the surface in good electrical contact with the photoelectric film and connected to a metal part extending through said insulating washer to provide an external electrode insulated from the metal tube, the space within the tube being evacuated to such a degree that electrons emitted by the photoelectric film are collected by the wall of the tube.

HAROLD W. WOOLLEY.

REFERENCES CITED

The following references are of record in the file of this patent:

UNITED STATES PATENTS

| Number | Name | Date |
| --- | --- | --- |
| 1,596,758 | Mutscheller | Aug. 17, 1926 |
| 1,724,872 | Case | Aug. 13, 1929 |
| 1,851,706 | Hull | Mar. 29, 1932 |